US009627823B1

(12) United States Patent
McClurkan

(10) Patent No.: US 9,627,823 B1
(45) Date of Patent: Apr. 18, 2017

(54) REMOTE CONTROLLED EXTENSION CORD WITH EMBEDDED HOUSING FOR A REMOTE CONTROL

(76) Inventor: Michael McClurkan, Jonesboro, AR (US)

( * ) Notice: Subject to any disclaimer, the term of this patent is extended or adjusted under 35 U.S.C. 154(b) by 979 days.

(21) Appl. No.: 13/411,629

(22) Filed: Mar. 5, 2012

Related U.S. Application Data

(63) Continuation-in-part of application No. 12/699,495, filed on Feb. 3, 2010, now Pat. No. 8,129,858, which is a continuation of application No. 12/100,413, filed on Apr. 10, 2008, now Pat. No. 7,701,086.

(51) Int. Cl.
*H02J 1/00* (2006.01)
*H01R 13/703* (2006.01)
*H01R 13/72* (2006.01)

(52) U.S. Cl.
CPC ......... *H01R 13/7038* (2013.01); *H01R 13/72* (2013.01); *G08C 2201/20* (2013.01)

(58) Field of Classification Search
CPC . H01R 13/7038; H01R 13/72; G08C 2201/20
See application file for complete search history.

(56) References Cited

U.S. PATENT DOCUMENTS 8,110,942 B2 * 2/2012 Ensinger ............... H02J 7/0029 307/139
2011/0140933 A1 * 6/2011 Lee ........................ G08C 17/02 341/22
2012/0295662 A1 * 11/2012 Haubrich .......... H04M 1/72533 455/556.1

FOREIGN PATENT DOCUMENTS

GB WO 2008037428 A1 * 4/2008 ............ H02J 7/0029

* cited by examiner

*Primary Examiner* — Daniel Cavallari
(74) *Attorney, Agent, or Firm* — Muskin & Farmer LLC

(57) ABSTRACT

A remote controlled extension cord. The extension cord has a wire attached to a plug with an integrated base. The base serves to cradle a remote control, which is used to turn power on/off to the extensions on the cord. The extension cord has a number of advanced operations, for example a sequential flash operation which cycles power between all of the individual sockets in the extension cord in sequence, and then repeats the sequence. This can all be controlled by the remote control.

5 Claims, 9 Drawing Sheets

REMOTE CONTROLLED EXTENSION CORD WITH EMBEDDED HOUSING FOR A REMOTE CONTROL

CROSS REFERENCE TO RELATED APPLICATIONS

This Application is a continuation in part application of U.S. application Ser. No. 12/699,495, filed on Feb. 3, 2010, now U.S. Pat. No. 8,129,858, entitled, "Remote Controlled Extension Cord with Embedded Housing for a Remote Control", which is incorporated by reference herein in its entirety and is a continuation application of application Ser. No. 12/100,413, now U.S. Pat. No. 7,701,086, filed on Apr. 10, 2008, entitled, "Remote Controlled Extension Cord with embedded Housing for a Remote Control" which is incorporated by reference herein in its entirety.

BACKGROUND OF THE INVENTION

Field of the Invention

The present inventive concept relates to an extension cord with an integrated remote control.

Description of the Related Art

Remote control power cords are known in the art. For example, see West, U.S. Pat. No. D411,169. One disadvantage to this type of device is that it may be easy for the user to lose the remote control.

What is needed is a remote control extension cord which has a mechanism to discourage the loss of the remote unit.

SUMMARY OF THE INVENTION

It is an aspect of the present general inventive concept to provide an extension cord with additional features.

The above aspects can be obtained by an extension cord apparatus including (a) a socket unit comprising a plurality of individual sockets; a processing unit connected to the individual sockets and configured to control power to the individual sockets, the processing unit configured to implement a flash operation that temporarily turns off power to all of the sockets; and a remote control separate from the socket unit and adapted to communicate wirelessly with the processing unit, the remote control comprising a flash key configured such that upon being pressed initiates the flash operation.

The above aspects can also be obtained by an (a) a socket unit comprising a plurality of individual sockets; (b) a processing unit connected to the individual sockets and configured to control power to the individual sockets; and (c) a remote control separate from the socket unit and adapted to communicate wirelessly with the processing unit, the remote control comprising a slider that controls an amount of power provided to the individual sockets.

The above aspects can be obtained by (a) a socket unit comprising a plurality of individual sockets; (b) a processing unit connected to the individual sockets and configured to control power to the individual sockets, the processing unit configured to implement a sequential flash operation that implements a cycling of power between the plurality of individual sockets in sequence and repeats the cycling; (c) a remote control separate from the socket unit and adapted to communicate wirelessly with the processing unit, the remote control comprising a sequential flash key configured such that upon being pressed initiates the sequential flash operation.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1A:
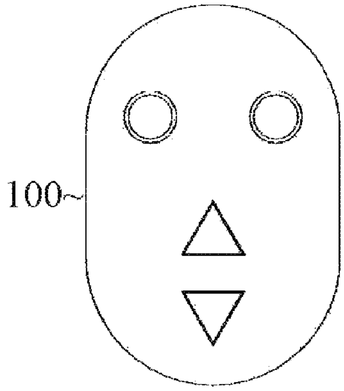
FIG. 1A is a top view of a remote control.

Reference will now be made in detail to the presently preferred embodiments of the invention, examples of which are illustrated in the accompanying drawings, wherein like reference numerals refer to like elements throughout.

Embodiments of the invention relate to an extension cord which is operated by a remote control, and a housing attached to the extension cord which is used to house the remote control. By locating the housing on the extension cord itself, and adapting the housing to securely, but removably, receive the remote control, a user would be less likely to lose the remote control.

FIG. 1A is a top view of a remote control.

A remote control unit 100 is used to turn on/off power to sockets 108 (not pictured in FIG. 1A).

Figure 1B:
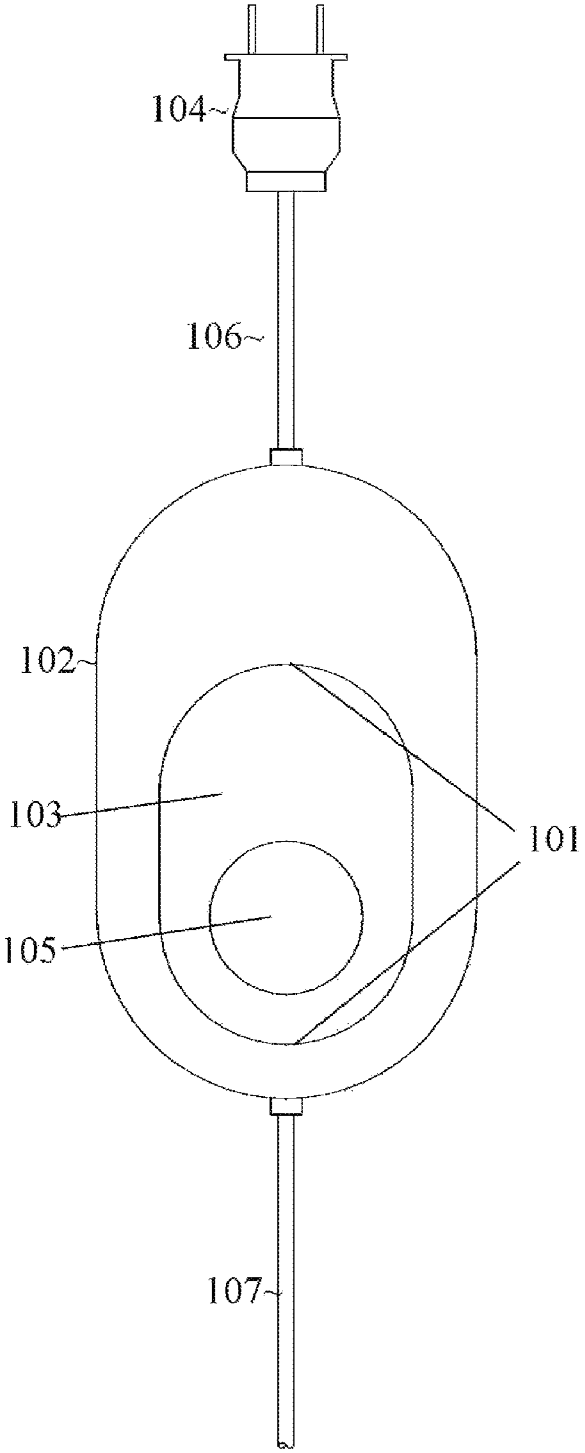
FIG. 1B is a top view of the extension cord.

FIG. 1B is a top view of the extension cord.

A plug 104 is plugged into an electrical outlet (not pictured), typically located on a wall. A first section of a power cord 106 connects the plug 104 to a base 102. The base 102 is used to house the remote control unit 100. The base comprises a hollow portion 101 inside the base which is sized to receive the remote control unit 100. The hollow portion 101 also comprises a housing floor 103, which is a surface that is recessed below an outer surface of the base 102. When the remote control unit 100 is inserted into the hollow portion 101, the remote control unit 100 will rest on the housing floor 103.

The hollow portion 101 comprises a hole 105 which can be used by an operator to dislodge the remote control unit 100 when the remote control unit 100 is secured inside the base 102. This can be done by the operator pressing his or her finger through the hole 105, thereby pushing the remote control unit 100 out of the base 102.

A second section of the power cord 107 connects the base 102 to the sockets 108 (not pictured in FIG. 1B). The first section of the power cord 106 and the second section of the power cord 107 are typically part of the same cord and there is no interruption of the cord or the conductive material throughout the cord. The cord passes through, or under, the base 102.

Figure 2:
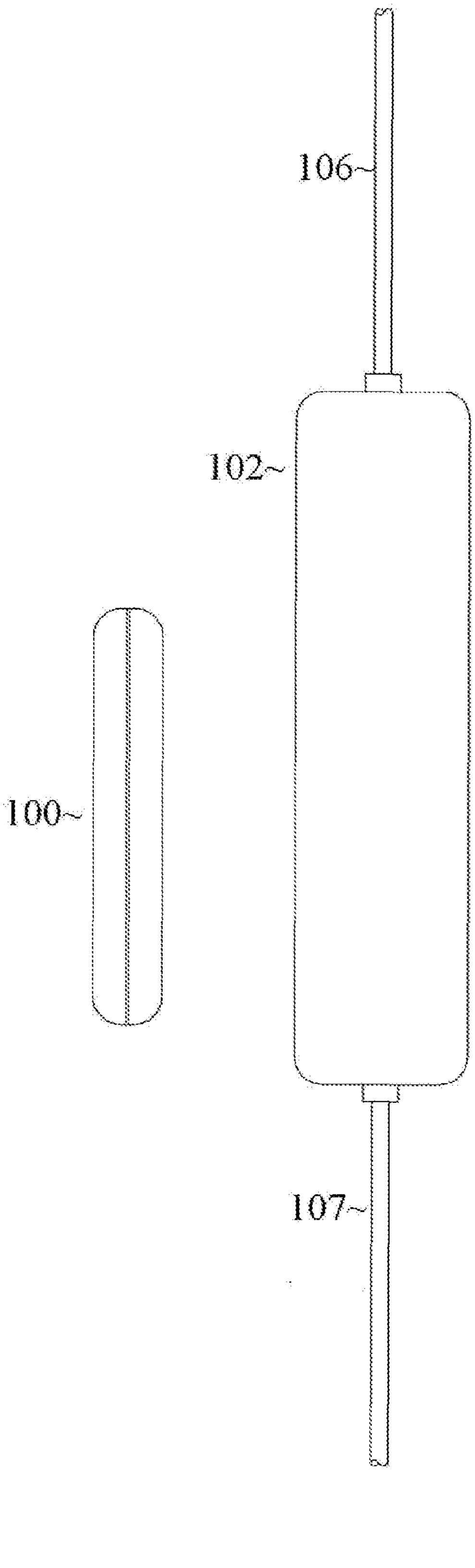
FIG. 2 is a side view of the remote control and extension cord.

FIG. 2 is a side view of the remote control and extension cord.

A remote control unit 100 is pictured alongside a base 102. The base is connected to a cord which has a first section 106 and a second section 107.

Figure 3:
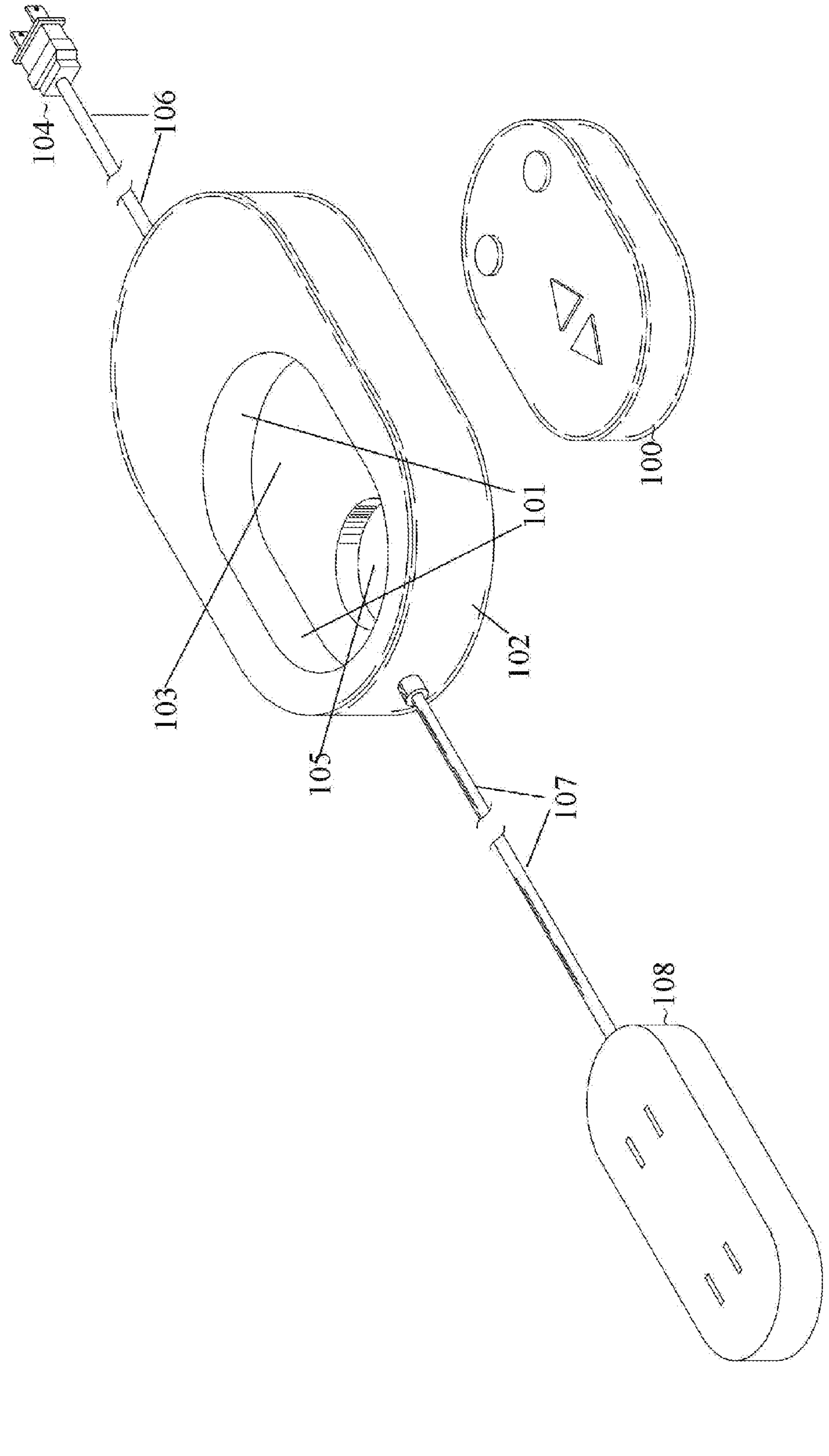
FIG. 3 is an orthogonal view of the remote control outside of the extension cord.

FIG. 3 is an orthogonal view of the remote control outside of the extension cord.

The base 102 comprises a hollow portion 101 which comprises a hole 105. The base is attached to first section of a cord 106 which is attached to a plug 104. The base 102 is also attached to a second section of a cord 107 which is in turn connected to sockets 108. The hollow portion 101 is the ovular portion which is really not a physical structure at all since it is a hollow portion. On the bottom of the hollow portion 101 is the housing floor 103, which the remote control unit 100 rests on when the remote control unit 100 is secured inside the base (see FIG. 4).

The remote control unit 100 is used to turn power on and off to the sockets. The remote control unit 100 can turn all of the sockets 108 on or off. Alternatively, the remote control unit 100 can be used to turn individual sockets on and off.

The remote control unit 100 would typically comprise an internal battery (not pictured) and a transmitter, as known in the art. The base 102 can comprise a battery (or other power source) to power a receiver (not pictured) which would detect a signal from the remote control unit 100.

Illustrated is the remote control unit 100 separated from the base 102. In this configuration, the user is free to walk around the room and operate the unit (e.g., turn power to the socket(s) on/off).

Figure 4:
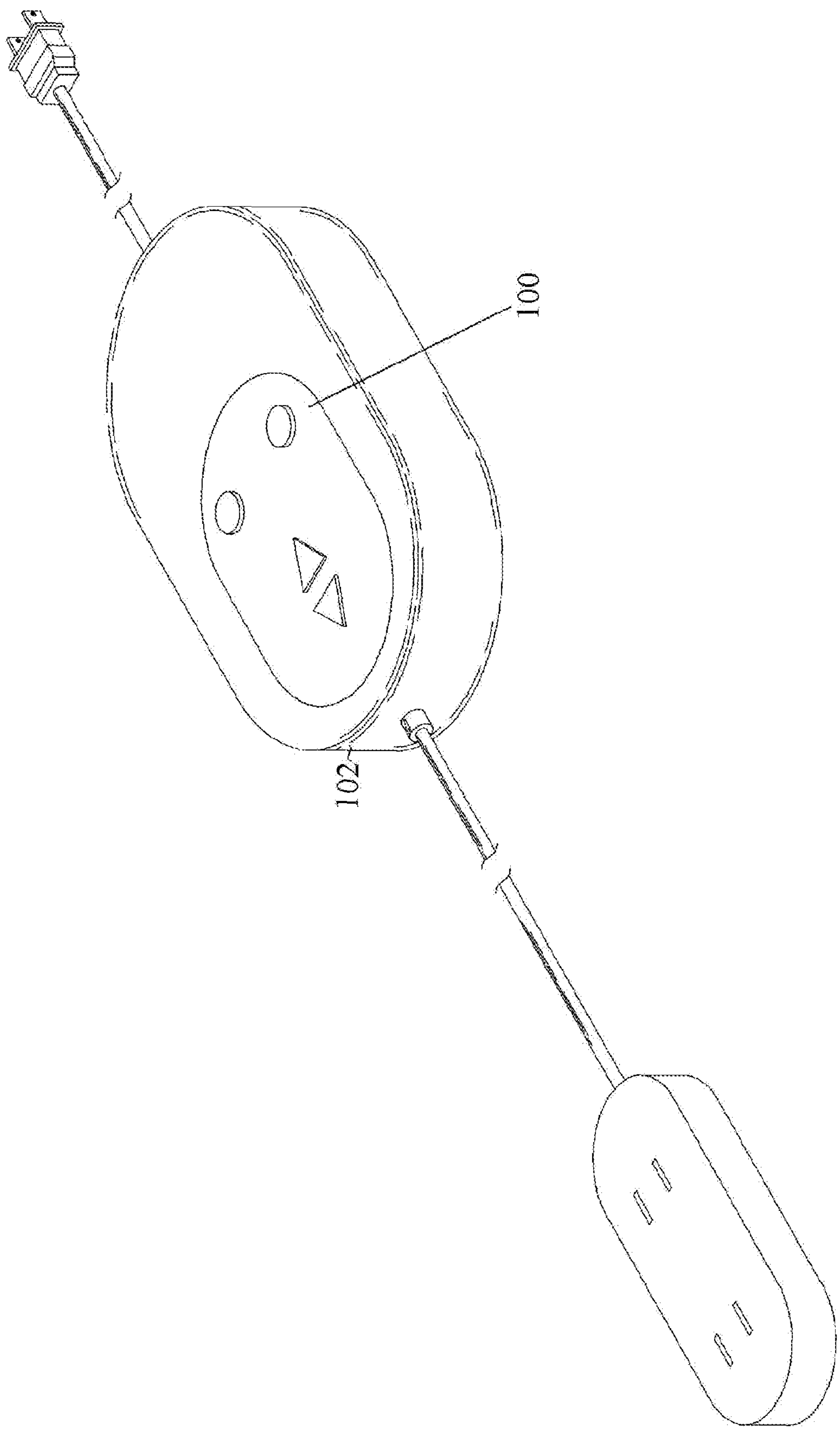
FIG. 4 is an orthogonal view of the remote control inserted inside the extension cord

FIG. 4 is an orthogonal view of the remote control inserted inside the extension cord.

When the user is done operating the remote control unit 100, the operator may wish to secure the remote control unit 100 in the base 102 for safekeeping (which would prevent the remote control unit 100 from being lost). The hollow portion 101 (shown in FIG. 3) is sized and adapted to allow the remote control unit 100 to make a snug fit therein. The housing floor 103 (show in FIG. 3) is used to support the remote control unit 100 so that the remote control unit 100 cannot be inserted any deeper into the base 102. Once inserted, the remote control unit 100 would remain inside due to internal physical force, until removed by the operator.

In a further embodiment, the extension cord can have various advanced operations which can be controlled remotely using the remote control. In a first advanced operation, the remote control can control the power to the sockets via a dimming slider. A user can slide the slider (which can range from no power to full power) which automatically adjusts the power to all sockets. This serves as a "light dimmer" but would "dim" whatever appliance is plugged into the socket(s). In a further embodiment, each individual socket can be adjusted via the slider (e.g., by pressing a button corresponding to the socket to be controlled and then adjusting the slider to control the power to that particular socket). The remote control can have an analog (or digital) slider which senses the position of the slider and transmits its position (if an analog slider is used its position is first converted to a digital amount) to a socket unit (the socket unit contains and controls all of the individual sockets). A processing unit (or controller) in the socket unit would adjust the power to the sockets in accordance with the position of the slider (received wireless from the remote control).

A second advanced operation using the remote control would trigger a "flash", that is, it would interrupt power to all sockets in the socket unit for a brief period of time (e.g., 2 seconds, etc.) Thus, a flash button can be present on the remote control and when pressed (when the power is on to all sockets), would cause an interruption of power (turn off power) to all of the sockets for the brief period of time (e.g., three seconds) and then power would be restored to all sockets. In a further embodiment, each individual socket can be remotely flashed as well.

A third advanced operation using the remote control would be a "sequential flash," that is, power to each of the individual sockets would cycle throughout all of the sockets and then repeat. For example, in a socket unit which has exactly three sockets (although this feature can be applied to a socket unit with any number of sockets), then a first socket would be powered while the remaining sockets are not, and after a brief period of time (e.g., one second), a second socket would be powered while the remaining sockets are not, and after a brief period of time (e.g., one second), a third socket would be powered while the remaining sockets are not, and after a brief power of time, the sequence repeats. Thus, for example, different lights can plugged in to different sockets in the socket unit, and when the sequential flash is initiated (e.g., by pressing a button on the remote control), the sequence can begin and the different lights can cycle on/off in sequence. The sequence can continue until the user terminates the sequence (e.g., by pressing a button on the remote control).

A fourth advanced operation of the remote control can be a learning feature, in which the remote control can learn to mimic other remote controls key presses. In this manner, the remote control can also function as other remote controls as well that the user may have. A learning remote control is described in U.S. Pat. No. 5,028,919, which is incorporated by reference herein in its entirety.

Figure 5:
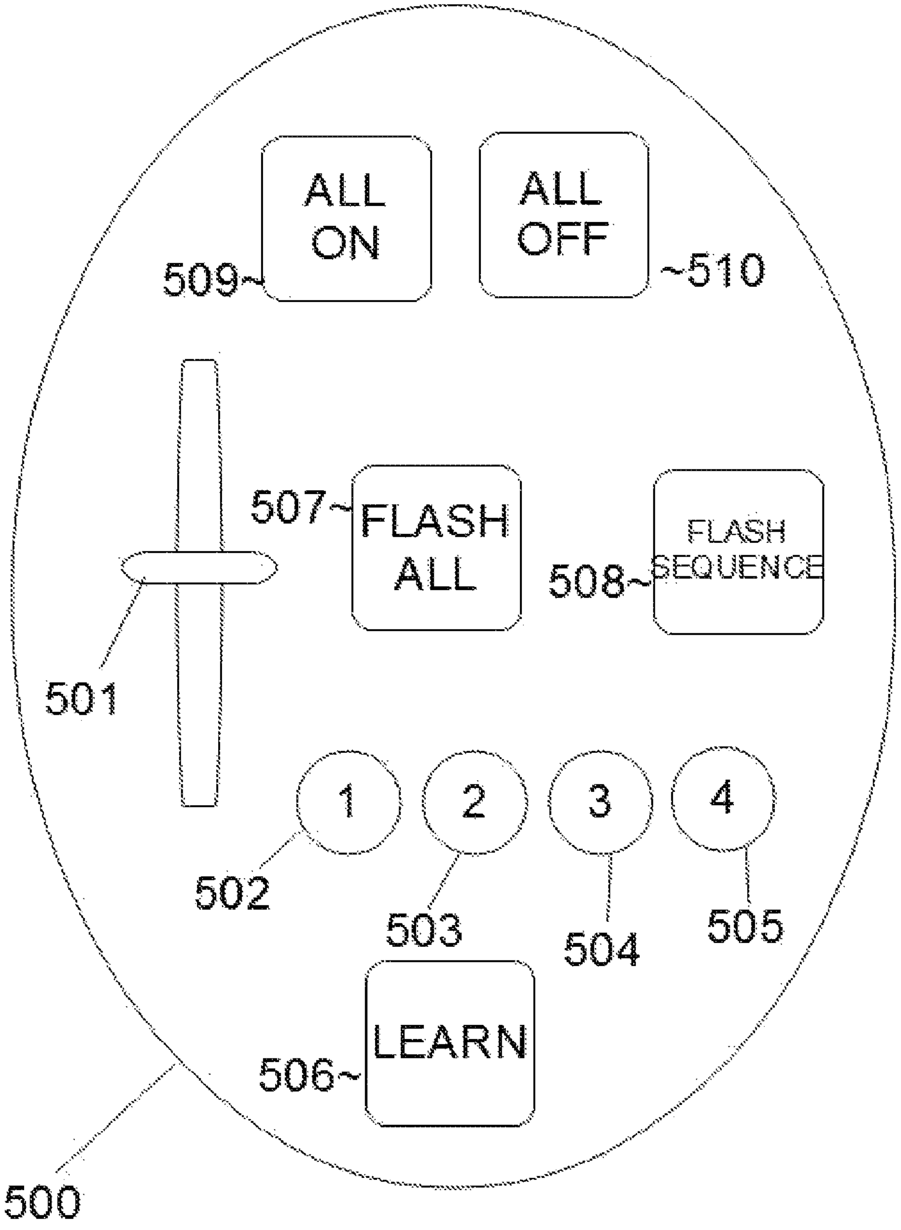
FIG. 5 is a drawing of an exemplary remote control keypad layout, according to an embodiment.

FIG. 5 is a drawing of an exemplary remote control keypad layout, according to an embodiment. It is noted that numerous layouts of a keypad on a remote control can be devised, and of course FIG. 5 is merely one example. In addition, the system (comprising the remote control and the entire extension cord) can combine any number of these features in any combination.

The remote control keypad layout 500 can include a slider 501 (also known as a "dimmer") which can be used to adjust the power to all of the sockets (sliding to the top would be 100% power while sliding to the bottom would be 0% power). Instead of dimming all of the sockets collectively, in a further embodiment, the slider 501 can dim the sockets individually, for example by pressing a socket button (502, 503, 504, 505) first to control that socket.

The layout 500 can also include an "all on" button 509, which when pressed, powers all of the sockets. The layout 500 can also include an "all off" button 510, which when pressed, powers off all of the sockets. The buttons do not have to be held down, that is, one simple press/release is all that is needed to turn the sockets on/off.

The layout can also have individual socket buttons 502, 503, 504, 505, which control the individual sockets. For example, pressing each of these buttons would turn on/off its respective socket. Alternatively, pressing each of these buttons would then enable the slider 501 to dim that particular socket. Alternatively, when a user presses and holds one of the individual socket buttons 502, 503, 504, 505, then the slider 501 would dim the particular socket corresponding to the button being held, while when a user presses/releases one of the individual socket buttons then it would just turn the corresponding socket on/off. The sockets in the socket unit can be numbered in sequence from left to right (e.g., first socket, second socket, third socket, fourth socket etc.) which correspond to button 1 502, button 2 503, button 3 504, and button 4 505.

A "flash all" button 507, when pressed, flashes all of the sockets (temporarily removes power to all of them). A "flash sequence" button 508, initiates the sequential flash. A "learn" button 506 is used to program the remote control to mimic other remote controls (this would require the remote to also have a receiver in addition to a transmitter).

Figure 6:
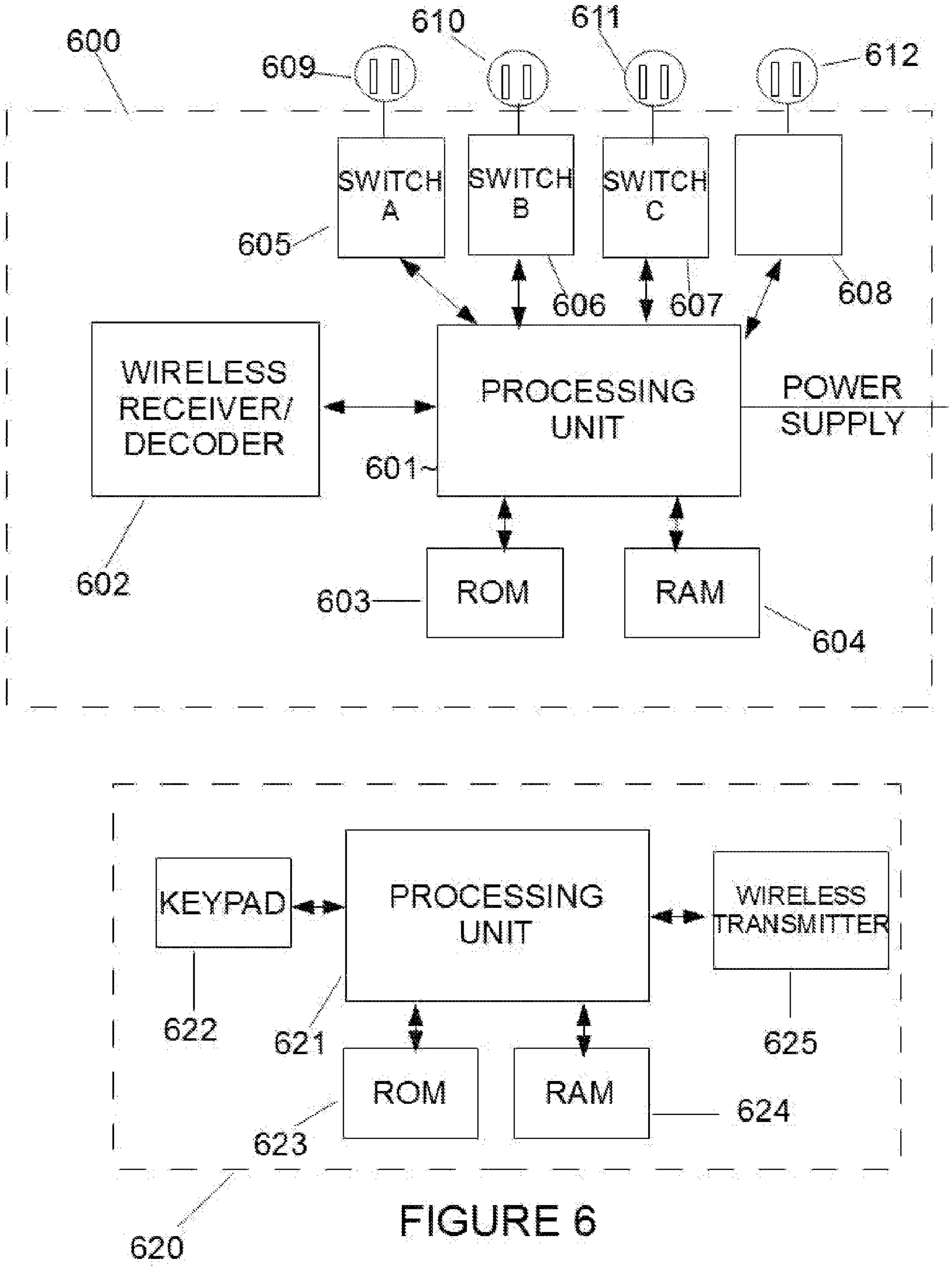
FIG. 6 is a block diagram of the electrical components of a socket an a remote control, according to an embodiment.

FIG. 6 is a block diagram of the electrical components of a socket and a remote control, according to an embodiment.

A socket unit 600 shows the components of what controls the individual sockets 609, 610, 611, 612 (and can be physical located in unit 108 from FIG. 3). A processing unit 601 can be a microprocessor and is used to control the unit. The processing unit 601 is connected to a wireless receiver/decoder 602 (which is used to receive wireless signals, decode them, and transmit what was received to the processing unit 601) and is used to implement features of the unit. The processing unit 601 can also be connected to a ROM 603 (which can contain instructions to control the processing unit 601 to implement any of the features described herein) and a RAM 604 (which can be used by the processing unit 601 to store temporary data). The RAM can store any temporary data needed, for example (in the embodiment where individual sockets can be dimmed individually using the slider 501) the amount of power to provide to each individual socket (e.g., each of the four sockets would have its own power value). The RAM can also store the value (representing the position) of the slider 501 so that this value does not have to be continuously transmitted by the remote (except when the slider 501 is moved). The processing unit 601 is also connected to switch A 605 which electrically switches first socket 609 on/off, and switch B 606 which electrically switches second socket 610 on/off, and switch C 607 which electrically switches third socket 611 on/off, and switch D 608 which electrically switches fourth socket 612 on/off. Thus, the processing unit can individually access and switch on/off the sockets individually and can also control the amount of power distributed to each of the sockets individually. The individual sockets 609, 610, 611, 612 would be physically located such that the plugs are outside of any physical casing (e.g., made of plastic, etc.) so that plugs of any electrical device (e.g., lamp, etc.) can be plugged in to the sockets. While this unit depicts four sockets, of course the system described herein can be implemented with any number of sockets.

A remote control circuit 620 is illustrated which comprises the internal components of the remote control 100. A processing unit 621 is connected to a keypad 622 in order to receive key presses pressed by the user, and can perform any feature of the remote control. The processing unit 621 can be connected to a ROM 623 (which can store instructions to control the processing unit 621 to implement any feature) and a RAM 624 (which can store temporary data). The processing unit 621 can also be connected to a wireless transmitter 625 which is used to transmit instructions (e.g., those pressed on the keypad 622) wirelessly which would then be read by the wireless receiver/decoder 602. Of course the wireless transmitter 625 and the wireless receiver/decoder 602 should be on the same frequency and use the same protocol in order for the socket unit 600 to be able to understand instructions from the remote control circuit 620. Also present is a power supply (not pictured). The processing unit 621 can also implement the learn operation. The processing unit 621 can be configured to transmit the position of the slider 501 whenever the position changes.

Figure 7:
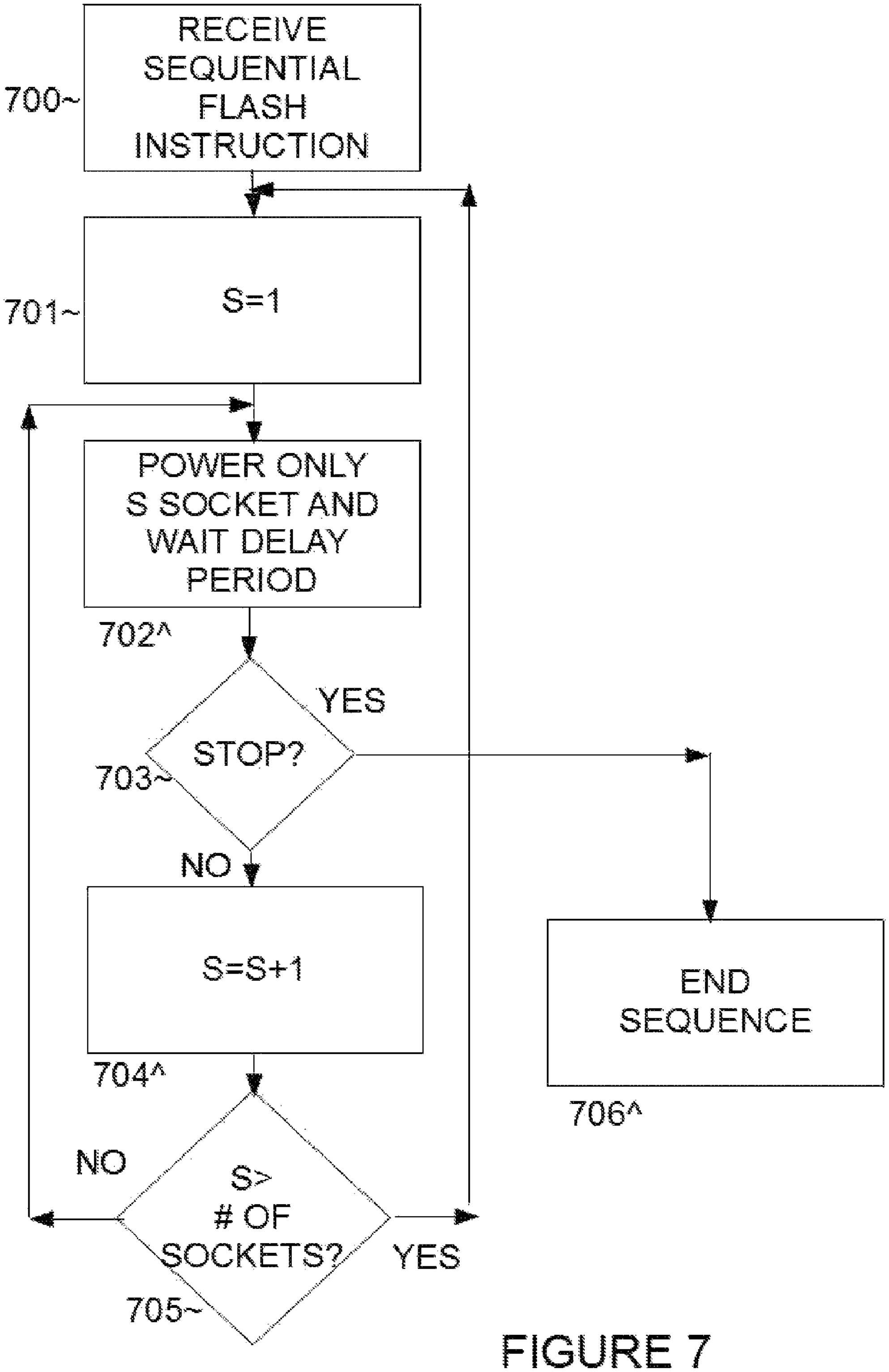
FIG. 7 is an exemplary flowchart illustrating a method of implementing a sequential flash, according to an embodiment.

FIG. 7 is an exemplary flowchart illustrating a method of implementing a sequential flash, according to an embodiment.

The method can begin with operation 700, which receives a sequential flash instruction. The instructions would be wirelessly received by the socket unit 600 which would have been transmitted by the remote control circuit 620 in the remote control. Of course the remote control is not physically connected to the socket unit 600 and the communication is made "through the air." The instruction would be identified as a sequential flash instruction by the processing unit 601 which would initiate and implement this sequence.

From operation 700, the method proceeds to operation 700, which sets variable S equal to 1. "S" is used as a variable herein to represent a particular socket being powered, although of course the processor 601 would not necessarily use this nomenclature.

From operation 701, the method proceeds to operation 702, which powers only socket S (but other sockets have no power) and waits a delay period (e.g., two seconds). In an alternate embodiment, instead of powering only socket S, the opposite can happen in operation 702 where socket S has no power and all other sockets will be powered. Thus, in this embodiment, if there are three sockets, then there will be two powered at each interval while the single socket that isn't powered will be cycled through each time operation 702 is executed. Note that the sockets that are powered/unpowered in operation 702 remain with their status until changed by a subsequent execution of operation 702 or when the sequence ends in operation 706.

From operation 702, the method proceeds to operation 703, which determines whether to stop the method. The method can be stopped, for example, if a particular button is pressed on the remote control which would cause the processing unit 601 to stop performing the sequence. If the method is going to stop, then the method proceeds to operation 706, which ends the sequence (the processing unit 601) terminates the sequence and returns to a "default" mode in which no action is taking place (but the power would typically be returned to all of the sockets).

If in operation 703, the method is not going to be stopped, then the method proceeds to operation 704, which increments S by one.

From operation 704, the method proceeds to operation 705, which determines if S is greater than the total number of sockets in the socket unit (e.g., FIG. 6 illustrates four individual sockets).

If S is greater than the total number of sockets in the socket unit, then the method returns to operation 701.

If S is not greater than the total number of sockets in the socket unit, then the method returns to operation 702.

The operations and configuration of FIG. 7 is merely one example, but of course the sequential flash operation can be implemented using any other logical sequence as well.

In a further embodiment, the remote control can have a learning function and can learn to operate other remote controls of the kind described herein. In this manner, a single remote control can control a number of extension cords. For example, a user can purchase two (or any number) of extension cords as described herein (each extension cord also coming with a remote), i.e., a first remote with a first extension cord and a second remote with a second extension cord. The user can select the first remote to be the "master remote" which can be taught to control both extension cords. The user can press the learn button 506 on the first remote and then press a button on the second remote (e.g., the 'flash sequence' button 508). The second remote will then transmit its flash sequence signal which is detected by the first remote. The second remote is now "paired" with the first remote. When the flash sequence button 508 is pressed on the first remote, it will now cycle through all sockets on both remotes in sequence. For example, if each extension cord has three sockets (numbered 1, 2, 3) then the following sequence will then be executed: socket 1 of extension cord 1; socket 2 of extension cord 1; socket 3 of extension cord 1; socket 1 of extension cord 2; socket 2 extension cord 2; socket 3 extension cord 2; repeat. Thus a single key press on the first remote can initiate this sequence on both remotes. More than two extensions/remotes can be linked together as well. Any of the features described herein can be applied to linked multiple extension cards as described herein.

Figure 8:
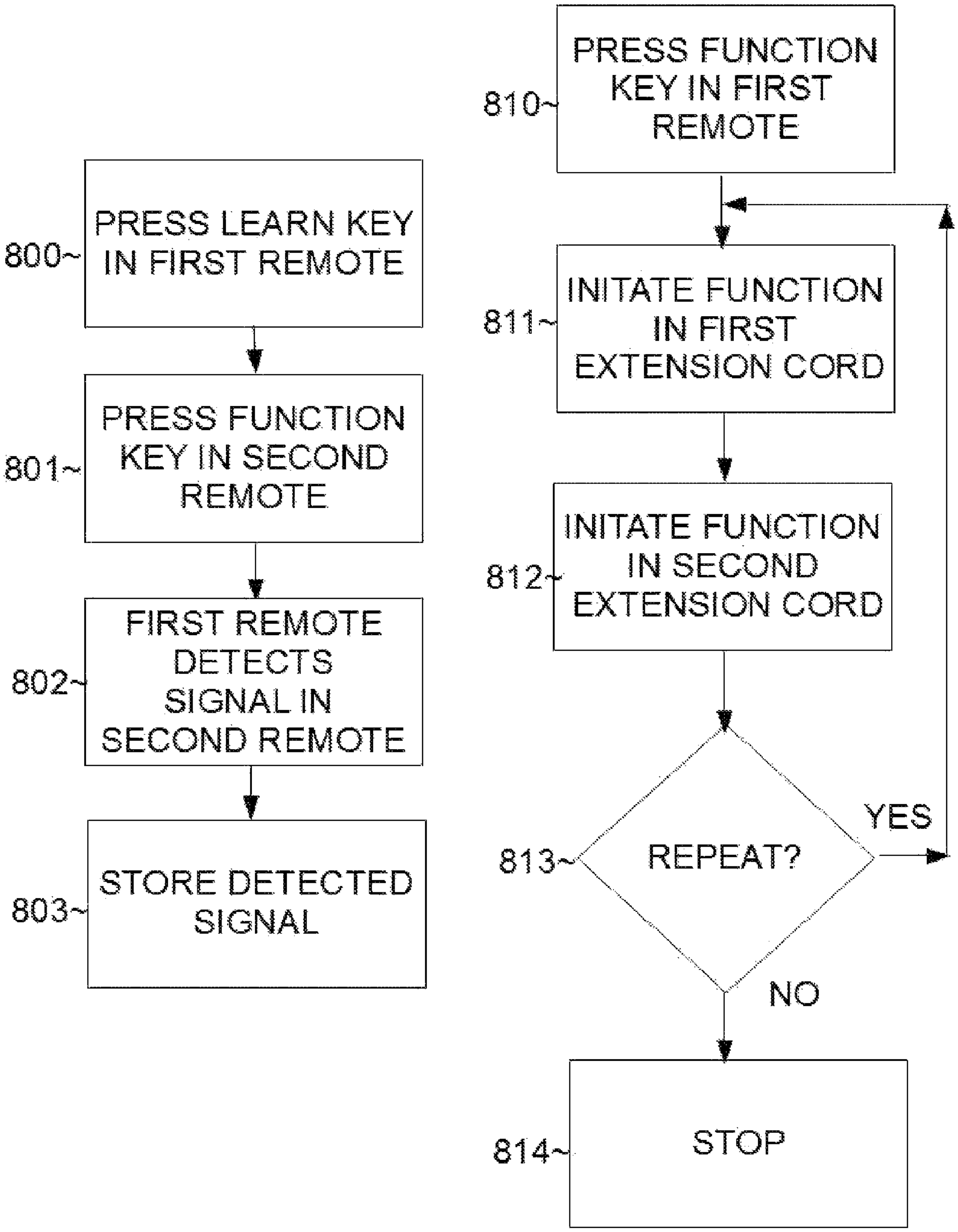
FIG. 8 is an exemplary flowchart illustrating a method of pairing extension cords, according to an embodiment.

FIG. 8 is an exemplary flowchart illustrating a method of pairing extension cords, according to an embodiment. A second remote is paired with a first remote so that the first remote is the 'master' remote and can control both extension cords. The first remote was sold with a first extension cord and the second remote was sold with the second extension cord.

The method can begin with operation 800, wherein a user presses a 'learn' button on a first remote.

From operation 800, the method proceeds to operation 801, wherein the user presses a function key (a key that performs a function, e.g., flash all, flash sequence, all on, etc.) on the second remote. The second remote then transmits the signal for the pressed key.

From operation 801, the method proceeds to operation 802, wherein the first remote detects the signal from the second remote sent in operation 802.

From operation 802, the method proceeds to operation 803, wherein the first remote stores the detected signal in memory in the first remote so that signal can be emulated.

Operations 800-803 illustrate the 'learning' process. In the alternative to actually detecting a signal transmitted by the second remote control, other mechanisms can be used to identify the second remote to the first remote (so the first remote control can look up the proper codes used by the second remote), for example an identification number can be located on the second remote that can be entered into the first remote control. Operations 810-814 illustrate the process of controlling both extension cords.

In operation 810, the user presses a function key in the first remote (the same function key that was pressed in the second remote, for example the flash sequence).

From operation 810, the method proceeds to operation 811, the first remote initiates the function of the function key pressed in operation 810 in the first remote. For example, if the flash sequence was pressed, then the flash sequence would be initiated in the first remote.

After the function has completed one iteration (e.g., if the flash sequence is pressed then after all sockets have been cycled through once) then the cycling would stop in the first extension cord (which can be terminated by the first remote) and operation 812 is performed which initiates the function in the second extension cord. This is done by sending the signal stored in operation 803 (which was learned in the first remote from the second remote). The function is now performed in the second remote. After the function has completed one iteration in the second remote then the cycling is terminated in the second remote (which can be terminated by the first remote by sending the detected signal again or another signal which the first remote knows will terminate activity in the second remote. This can be determined, for example, by pre-storing a table in the first remote of commands/frequencies that control other such remotes/extension cord sets, and when the signal is detected in operation 802 the first remote can then discern the type of remote/extension cord of the second remote/second extension cord and would know the set of respective commands to control the second extension cord).

In operation 813, if the sequence is to be repeated, then the method can return to operation 811. If the sequence is not to be repeated (e.g., a stop button is pressed on either remote), then the method proceeds to operation 814, which stops the activity in both extension cords (power in each cord can be restored to all sockets or cut off from all sockets).

Thus, for example, two extension cords can be paired so that the 'flash sequence' button pressed in a first remote would cause the sequence to occur in both extension cords so that it is as if both extension cords were really one big extension cord. The 'flash all' button could cause the power in both extension cords to temporarily be turned off. The 'all on' button could turn the power on in all sockets in both extension cords. The 'all of' button could turn the power off in all sockets in the both extension cords. The dimmer can dim the power in all sockets on both extension cords. Thus, when a first remote is paired with a second remote, the first remote controls both respective extension cords so that in effect all sockets in both extension cords would be considered the first extension cord and all functions of the first remote would be applied to all sockets. Thus, if each extension cord has three sockets and are paired together, then when the 'flash sequence' key is pressed in the master remote, the power would be cycled throughout the six sockets in sequence as if they were all part of one extension cord. The cycling can continue indefinitely until stopped by the user. All features herein can be applied to paired remote controls/extension cords and the features are implemented such that all sockets on the second extension cord would be part of the first extension cord.

Thus, the pairing feature can be accomplished by: (a) providing a first remote control associated with a first extension cord and a second remote control associated with a second extension cord; (b) identifying the second remote control to the first remote control; (c) configuring the first remote control so that a function initiated on the first remote control is applied to both the first extension cord and the second extension cord. The function can be a flash sequence that repeats cycles of power between all sockets on both the first extension cord and the second extension cord. The function can also be a flash which temporarily turns the power off to all sockets on both the first extension cord and the second extension cord. The function can also be a simple 'all on' or 'all off' which turns the power on/off to all sockets in both the first extension cord and the second extension cord. In this way, a user could have multiple such extension cords yet only have to carry one remote around.

In a further embodiment, the cord itself can be the component that learns. A cord can be taught to be controlled by any remote that was sold as part of a remote/extension cord set as described herein. For example, a button can be pressed on the extension cord itself which would then initiate a learning sequence where a user can press a button on a remote control (but the remote control must be the same remote that came with this extension cord or came with another extension cord of the same model as described herein or was sold separately for this purpose). Thereafter the cord will then be controlled by that remote control. In this manner, a number of extension cords can be programmed to respond to the same remote control.

Figure 9:
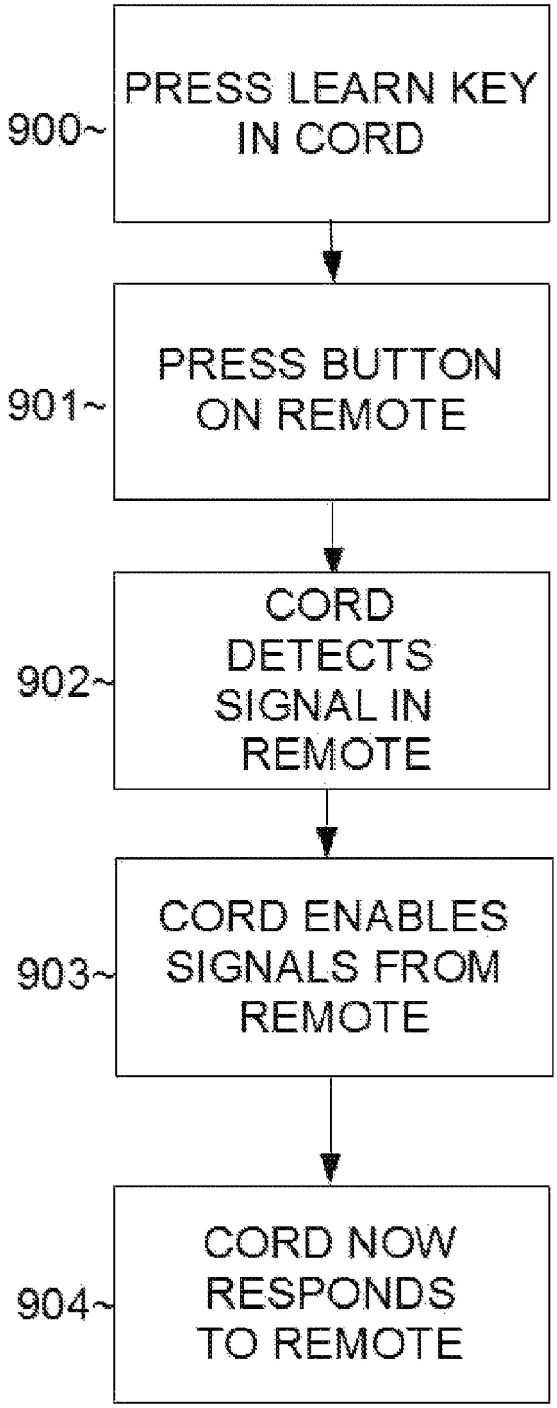
FIG. 9 is an exemplary flowchart illustrating a method of a cord learning to respond to a remote, according to an embodiment.

FIG. 9 is an exemplary flowchart illustrating a method of a cord learning to respond to a remote, according to an embodiment.

The method can begin with operation 900, wherein the user presses a learn button on a an extension cord. The extension card can be any cord as described herein. The learn button initiates a learning sequence on the cord so that the cord will detect and decode a forthcoming signal from a remote.

From operation 900, the method proceeds to operation 901, wherein the user presses a button on the remote. The button can be the power button but can also be another predefined button. The remote will wirelessly transmit the signal for the button pressed.

From operation 901, the method proceeds to operation 902, wherein the cord now detects the signal transmitted by the remote in operation 902. This can be done as known in the art, such as described in U.S. Pat. No. 5,028,919. The signal transmitted can be identified by characteristics (including but not limited to) frequency, pulses, etc. The detected signal can be considered the "remote ID" and can identify which type of remote was used in operation 901 (e.g., which signals that remote is configured to transmit for each key). For example (according to Table I), if the signal received is an F signal, then the remote ID is A, while if the signal received is a J signal then the remote ID is B.

Operations 901-902 identify the remote to the cord. In an alternative embodiment, the remote to be used can be identified to the cord not by pressing a button on the cord and then the remote (as described herein) but by the user pressing keys on the cord to identify the remote to the cord. For example, each remote can have a model or ID number printed on it and the user can type in this number into the cord using keys on the cord. The keys would identify the remote ID to the cord.

From operation 902, the method proceeds to operation 903 wherein the cord now enables the respective signals from the remote (based on the remote ID from operation 902) so that the cord will now respond with the appropriate function to key presses from the remote used in operations 901-902. If two remotes have the same remote ID then they will send identical signals and both will operate the cord identically. Note that the remote that the cord was initially programmed to respond to will no longer be active (unless this remote is the same remote ID from operation 902). A reset button can also be located on the cord in order to return the cord to responding to the remote that the cord was initially packaged and sold with.

Remotes and their corresponding extension cords would be have with a number of different remote IDs so that different cords can be independently controlled by their respective remote control. But the cords can be programmed (as described herein) to respond to the same remote.

The cord needs to know all of the other buttons and their wireless signals on the remote used in operations 901-903, so the cord can respond appropriate to all of these signals. The programming in the cord can store a table (or other data structure) which associates the signal detected in operation

903 (the remote ID) to a plurality of other signals (which are generated when respective buttons are pressed on the remote) and their respective functions. In this way, the cord now knows that whenever it detects any of these signals, it will react appropriately.

Table I

| Remote ID | Signal | Button/ function |
|---|---|---|
| A | F | power |
| A | G | flash |
| A | H | all on |
| A | I | all off |
| B | J | power |
| B | K | flash |
| B | L | all on |
| B | M | all off |

Thus, for example, in Table I there are two types of remote IDs (although of course more than two unique remote IDs can be sold in real life). Table I only represents three buttons although of course remotes would typically have many more than three buttons. When in operation the cord detects signal F in operation 902, the cord knows the remote is a remote ID A and thus the corresponding mapping from Table I can be used in order for this cord to know how to respond when future wireless signals are received. Similarly, if signal J is received by the cord then the cord would know that the remote ID is B and thus would only respond to remote ID B signals. It is noted that the signal letters in the signal column in Table I (F to M) represent actual physical signals characteristics of a unique signal corresponding to a key press on a remote (the signal can include characteristics such as frequency, pulse, duration, coding, etc.) but it is not necessary to delve into these actual characteristics for purposes of this application and thus different signals are represented by letters.

For example, assume a user purchases a first remote/cord set with remote ID A and a second remote/cord set with remote ID B. Out of the box, each remote only controls its associated cord. The user can program the second cord to response to the first remote (by pressing the learn button on the second cord and then pressing the power button on the first remote). Now, the second cord will be keyed to remote ID A so that when signals G, H, I are received by the cord then it will execute functions flash, all on, all off respectively. So now, the first remote will control both cords and when the user presses all on, the power on all sockets on both cords will turn on. All functions (e.g., sequential flash, etc.) described herein can be implemented using the techniques described. The second remote will no longer respond to its innate signals (K, L, M) although in another embodiment the second cord can still respond to its innate signals. A reset button can be present on the cords to return the cord to responding to its innate signal and terminate responding to any learned remote.

In this manner, a user can program a cord to respond to different remotes than it was sold with. Thus, a user can use two or more cords and program the two or more cords to respond to the same single remote. Thus, pressing the "all on" button on this single remote would cause all sockets on the paired (two or more) cords to turn on (and all other functions would operate on these cords). The sequential flash button would cause the sequential flash sequence to initiate on all of these cords, but note in this embodiment the sequential flash sequence would cause the same socket in different cords to all power simultaneously. For example if a first cord has sockets 1, 2, 3 and a second cord has sockets 1, 2, 3 then when the flash sequence button is pressed (and the cords are programmed to respond to the same remote) then the flash sequence would first power socket 1 in both cords, then socket 2 in both cords, then socket 3 in both cords, and then repeat. Typically, each cord would not know that other cords are present which are paired to the same remote. Similarly, the remote would not know how many cords are paired to it as the remote simply sends out its signals. A remote paired to a cord means that a cord is controlled by the remote (either because it was programmed to by the user or because the remote innately controls the cord out of the box).

The learning extension cord described herein can be implemented by a method that includes (a) providing a first remote control paired to a first cord so the first cord responds to the first remote, the first remote configured to transmit a set of remote signals; (b) providing a second cord not initially paired to the first remote; (c) pressing a learn button on the second cord; (d) pressing a button on the first remote sending an identifying signal; (e) the second cord receiving and decoding the identifying signal; (f) the second cord, based on the identifying signal, identifying the set of remote signals, (g) the second cord now being enabled to response to the set of remote signals by performing a respective function, wherein the first cord and the second cord now both respond (are paired to) the first remote which simultaneously controls both the first cord and the second cord. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An extension cord apparatus, the apparatus comprising:

a plurality of sockets;

a learn button; and a processing unit configured to: a) upon a press of the learn button, detect an identifying signal, b) identify, using the identifying signal, a set of remote signals, c) respond to the set of remote signals by performing a respective function out of a set of functions, each respective function out of the set of functions being associated with a respective remote signal out of the set of remote signals, each of the remote signals in the set of remote signals associated with a respective button on a remote control.

2. The apparatus as recited in claim 1, further comprising the remote control, which is configured to transmit the identifying signal.

3. The apparatus as recited in claim 1, wherein the processing unit is further configured such that the set of functions comprises flash, sequential flash, dim, all on, all off.

4. The apparatus as recited in claim 1, further comprising a second extension cord apparatus comprising: a second plurality of sockets; a second learn button;

and a second processing unit configured to: a) upon a press of the second learn button, detect a second identifying signal, b) identify, using the second identifying signal, a second set of remote signals, c) respond to the second set of remote signals by performing a respective function out of a second set of functions, each respective function in the second set of functions being associated with a respective remote signal out of the second set of remote signals; and the remote control, each of the remote signals in the second set of remote signals associated with a respective button on the remote control, wherein the extension cord apparatus and the second extension cord apparatus are both configured such that both the extension cord apparatus and the second extension cord apparatus enable control by the remote control.

5. The apparatus as recited in claim 4, wherein the second processing unit is further configured such that the second set of functions comprises flash, sequential flash, dim, all on, all off.

* * * * *